United States Patent [19]

Koehnlein et al.

[11] Patent Number: 4,997,713

[45] Date of Patent: Mar. 5, 1991

[54] ELECTRIC CABLES WHICH CONTAIN INSULATIONS BASED ON ETHYLENE POLYMERS HAVING HIGH RESISTANCE TO THE FORMATION OF WATER TREES

[76] Inventors: Ernst Koehnlein, 4 Ungsteiner Strasse; Johannes Schlag, 36 Leuschnerstrasse; Heinz Vogt, 30 Pranckhstrasse; Peter Bauer, 13 Erich-Kaestner-Strasse; Alfred F. Hauss, 6 Osloer Weg, all of 6700 Ludwigshafen, Fed. Rep. of Germany

[21] Appl. No.: 349,761

[22] Filed: May 10, 1989

[30] Foreign Application Priority Data

May 13, 1988 [DE] Fed. Rep. of Germany ....... 3816397

[51] Int. Cl.$^5$ .................... B32B 15/00; D02G 3/00
[52] U.S. Cl. .................... 428/379; 428/375; 174/110 PM
[58] Field of Search ............. 428/389, 383, 379, 375; 525/919, 229, 209; 174/110 PM, 120 SR; 527/329.6

[56] References Cited

U.S. PATENT DOCUMENTS

| | | | |
|---|---|---|---|
| 4,369,331 | 1/1983 | Koegh | 428/389 |
| 4,452,937 | 6/1984 | Keogh | 174/110 PM |
| 4,876,147 | 10/1989 | Schlag et al. | 428/379 |

FOREIGN PATENT DOCUMENTS 2034723  6/1980  United Kingdom .

OTHER PUBLICATIONS

Chem. Abstract, 98:5097v; Polyethylene Electric Insulators.
Chem. Abstract, 101:193825h; Crosslinked Polyethylene Cable.

Primary Examiner—George F. Lesmes
Assistant Examiner—Jill M. Gray
Attorney, Agent, or Firm—Keil & Weinkauf

[57] ABSTRACT

In an electric high voltage cable of 1–500 kV, the cable insulation is resistant to the formulation or the growth of water trees and consists of from 70 to 99 parts by weight of an ethylene polymer (I) and from 1 to 30 parts by weight of an ethylene copolymer (II) which is composed of from 80 to 92% by weight of ethylene and from 8 to 20% by weight of a $C_4$–$C_{10}$-α-olefin having a density of from 0.890 to 0.915 g/cm$^3$ and a crystallite melting point of from 90° to 125° C.

4 Claims, No Drawings

ELECTRIC CABLES WHICH CONTAIN INSULATIONS BASED ON ETHYLENE POLYMERS HAVING HIGH RESISTANCE TO THE FORMATION OF WATER TREES

The present invention relates to an electric high voltage cable of 1-500 kV, wherein the cable insulation is resistant to the formation or the growth of water trees and consists of from 70 to 99 parts by weight of an ethylene polymer (I) and from 1 to 30 parts by weight of an ethylene copolymer (II), which differs from (I), and conventional additives in customary amounts.

In such ethylene polymer insulations for electric high voltage cables and conductors, the simultaneous action of high electric field strengths and humidity may result in the formation of water trees, which are regarded as a weakening of the insulation and therefore must be avoided by means of suitable additives.

There have been many proposals for avoiding or preventing the danger of water trees, the said proposals relating to the composition or the addition of substances which inhibit the formation of water trees.

For example, DE-A-29 48 492 discloses that polyolefin material intended for cable insulations can be washed with pure water after granulation directly before extrusion, in order to remove the small amounts of water-soluble and hygroscopic salts which give rise to the water trees (cf. DE-A-29 11 756). The disadvantage of this known process is that it is relatively expensive since the granules have to be dried with hot air after the washing process.

The addition of water tree inhibitors derived from polymer materials to the polyolefin cable material before its preparation has also been described. For example, the following are recommended for this purpose in the literature: organopolysiloxanes (cf. US-A-4 492 647 and 4 536 530 and EP-A-109 797), polyethylene glycols (cf. EP-A-57 604), epoxy resins (cf. Chem. Abstr. 96: 182235), ethylene/but-1-ene or ethylene/hex-1-ene copolymers (cf. Chem. Abstr. 101: 193825), polypropylene (cf. Chem. Abstr. 102: 8329), polybut-1-ene (cf. Chem. Abstr. 98: 5097), ethylene/vinyl acetate copolymer (cf. Chem. Abstr. 93: 169329), polystyrene and trially isocyanurate (cf. DD-A-160 808), ethylene/vinyl acetate or ethylene alkyl acrylate copolymer grafted with styrene (cf. Chem. Abstr. 103: 7802), polyvinyl alcohol (cf. Chem. Abstr. 95: 204983), chlorosulfonated polyethylene (cf. Chem. Abstr. 95: 204981), polyamide (cf. Chem. Abstr. 96: 21007), ethylene/ethyl acrylate copolymer (cf. Chem. Abstr. 99: 177160) and a styrene copolymer, e.g. styrene/butadiene or styrene/isoprene rubber (cf. Chem. Abstr. 92: 7572).

In the known polyolefin cable materials described above, containing added polymeric water tree inhibitors, the effects and the influence on water tree growth differ very greatly, and quantitative information is missing in most cases. In many cases, the additives have an adverse effect on the homogeneity of the polyolefin cable material and on the aging resistance of the insulation material and on the electrical properties (relative permittivity and dielectric loss factor).

It has also been disclosed that ethylene/$\alpha$-olefin copolymers can be blended with ethylene polymers and these blends used to prepare materials for cable insulation (cf. GB-A-20 34 723, Chem. Abstr. 101: 193 143 or Chem. Abstr. 101: 112 084). The known blends have good mechanical properties and can readily be cross-linked by exposure to high energy radiation.

EP-A-248 148 describes cable insulations which have high resistance to the formation of water trees and consist of a blend of two ethylene polymers; one ethylene polymer may be polyethylene and the second polymer is a terpolymer of ethylene, an acrylate and acrylic acid. However, polyolefin cable materials of this type still have the disadvantage that their mechanical strength is low and their adhesion to other, for example, conductive, layers of the cable insulation is higher than that of the materials according to the invention. The last-mentioned property in particular makes handling difficult during the production of connections and links. Furthermore, the content of comonomers in the total blend must be higher compared with the novel polymers if the desired effect of inhibiting the formation and growth of water trees is to be achieved.

It is an object of the present invention to overcome the disadvantages mentioned and to provide a cable insulation for electric cables which is based on ethylene polymers which both have high resistance to the formation or growth of water trees and exhibit low dielectric losses and high aging resistance as well as very good processibility.

We have found that these objects are achieved by electric high voltage cables having cable insulations of the type defined at the outset, wherein the ethylene polymer (II) is composed of from 80 to 92% by weight of ethylene and from 8 to 20% by weight of a $C_4$–$C_{10}$-$\alpha$-olefin having a density of from 0.890 to 0.915 g/cm$^3$ and a crystallite melting point of from 90° to 125° C.

Another preferred electric high voltage cable is one in which the ethylene polymer (I) is an ethylene homopolymer prepared by the high pressure polymerization process, an ethylene/alkyl acrylate copolymer, an ethylene/alkyl acrylate/acrylic acid terpolymer or a blend of these polymers.

The ethylene polymer (I) preferably has a melt flow index of from 0.2 to 10 g/10 min and a density of from 0.890 to 0.934 g/cm$^3$.

Another preferred electric high voltage cable is one in which the ethylene copolymer (II) has a heterogeneous distribution of the $\alpha$-olefin, possesses a melt flow index of from 0.5 to 20 g/10 min and a ratio $\overline{M}_w/\overline{M}_n$ of from 3 to 6, $\overline{M}_w$ and $\overline{M}_n$ being, respectively, the weight average and number average molecular weight, and is prepared using a Ziegler catalyst system.

Electric cables and ethylene polymer insulations for electric cables and conductors are well known. High voltage cables are those whose electric load is not less than 1 kV, preferably from 10 to 500 kV, in particular from 20 to 500 kV.

Cables of this type thus differ from conventional cables and conductors in the higher electric load in combination with higher temperatures.

It is important that the insulation material has particular physical, mechnical and electrical properties to make it suitable for these special applications in the cable industry. In the present case, the intention is to improve, in particular, the resistance to the formation of water trees so that, when an ethylene polymer material which for technical reasons is unavoidably contaminated with water-soluble salts is used under high voltage loads in the presence of water or humidity, the life of the insulation is increased compared with untreated material, so that it has greater breakdown strengths even over a prolonged period. Since the permissible conductor temperature is 90° C., good aging resistance, i.e. longlasting stability to thermal oxidation and deterioration of the mechanical properties, should also be ensured.

For the purposes of the present invention, the ethylene polymers (I) are ethylene homopolymers and copolymers which differ from the ethylene/α-olefin copolymer (II). Ethylene polymers of this type are sufficiently well known to require no further description.

Particularly suitable ethylene polymers (I) are ethylene homopolymers prepared by the high pressure polymerization process, and ethylene/alkyl acrylate copolymers, in particular ethylene/ethyl acrylate, ethylene/nor tert-butyl acrylate or ethylene/ethylhexyl acrylate copolymers, or ethylene/alkyl acrylate/acrylic acid copolymers (cf. for example EP-A-248 148).

The alkyl acrylate content of the ethylene/alkyl acrylate copolymers may be from 2 to 20% by weight.

In the uncrosslinked state, the ethylene polymers (I) preferably have melt flow indices of from 0.2 to 10 g/10 min, measured according to ASTM-D 1238-70 at 190° C. and under a load of 2.16 kg, and densities of from 0.890 to 0.934 g/cm$^3$, measured according to DIN 53,479. Instead of the pure ethylene homopolymers and copolymers, blends of various ethylene polymers are also suitable. Such ethylene polymers, their properties and their preparation are described in, for example, Ullmanns Encyklopädie der technischen Chemie, 4th edition, Volume 19, Verlag Chemie GmbH, D-6940 Weinheim, 1980, pages 169-195; Kunststoffe 67 (1977), 118-121, and U.S. Pat. Nos. 3,117,953 and 4,217,431. The ethylene polymers (I) may be crosslinked or uncrosslinked but are preferably 50-90% crosslinked, by means of either peroxides or high energy radiation.

The novel electric high voltage cables contain, in addition to the ethylene polymer (I), from 1 to 30, preferably from 5 to 20, parts by weight of an ethylene copolymer (II) which differs from (I), the weights being based on the weight of the ethylene polymer (I). The ethylene copolymer (II) is blended with the ethylene polymer (I) in a conventional mixer by a customary method.

The blend of ethylene polymer (I) and ethylene copolymer (II) also contains conventional additives in the usual amounts. Conventional additives are, in particular, antioxidants, flameproofing agents, crosslinking assistants, such as triallyl cyanurate, and crosslinking agents, such as organic peroxides, in amounts of from 0.5 to 3.0% by weight, based on the blend.

The ethylene copolymer (II) should be a copolymer of from 80 to 92% by weight of ethylene and from 8 to 20% by weight of a $C_4$-$C_{10}$-α-olefin, preferably a $C_4$-$C_8$-α-olefin, in particular a $C_4$-$C_8$-α-olefin, the sum of the percentages always being 100.

The ethylene copolymers (II) are well known and are commercially available under the name VLDPE (=very low density polyethylene) (cf. UCAR®-FLX resins DFDA-1137 Natural 7 and DFDA-1138 Natural from Union Carbide Corp., USA). The ethylene copolymers (II) to be used according to the invention preferably contain but-1-ene, hex-1-ene or oct-1-ene as a comonomer and have a melt flow index of from 0.5 to 20, preferably from 1 to 10, g/10 min, measured according to ASTM D 138-65 T at 190° C. and under a load of 2.16 kg, a density of from 0.890 to 0.915 g/cm$^3$ according to DIN 53,479 and a ratio $\overline{M}_w/\overline{M}_n$ of from 3 to 6, determined by gel permeation chromatography, and a crystallite melting point of from 90 to 125° C., preferably from 116° to 120° C., determined according to ASTMD 3418-82 using differential scanning calorimetry (DSC). The copolymers (II) are obtained by low pressure polymerization in the presence of a Ziegler-Natta catalyst (cf. EP-A-4645 and 4647) and have a heterogeneous distribution of the α-olefin. Heterogeneous copolymers of this type are described in, for example, U.S. Pat No. 4,359,561.

The advantages obtainable with the invention are, in particular, that a high voltage cable having a cable insulation material based on ethylene polymers is made available, both the formation or growth of water trees being inhibited and low dielectric losses and high aging resistance in combination with very good processibility and high mechanical strength being obtained.

COMPARATIVE EXAMPLE A

Low density polyethylene having a melt flow index of 2 g/10 min and a density of 0.918 g/cm$^3$ is treated with 0.3% by weight of 4,4,'-thiobis-(6-tert-butyl-3-methylphenol) as a heat stabilizer and 1.8% by weight of dicumyl peroxide as a crosslinking agent.

This formulation is used to produce 1 mm thick pressed sheets at 130° C., the polyethylene not being crosslinked.

In the test for water trees, sodium chloride in the form of small crystals (edge length 10 μm) is introduced in finely divided form as a layer in the polyethylene. This is done by dusting the salt onto the uncrosslinked sheet, then placing a second identical sheet on top and pressing the sandwich at 200° C. for 10 minutes to a thickness of 1 mm. During this procedure, the polyethylene undergoes crosslinking.

Thereafter, the samples are subjected to 100% atmospheric humidity at a field strength of 2.5 kV/mm.

After the samples have been subjected to an electric load, the number, the length and the structure of the resulting water trees in the individual samples are determined under an optical microscope. The number of water trees is determined in the beam parallel to the direction of the electric field to which the sample was subjected.

The number of water trees formed is expressed relative to the number of NaCl crystals and as an amount in percent by weight in the Table. The length of the water trees is determined from about 0.5 mm thick cuts through the sample, the viewing direction being at right angles to the direction of the electric field.

The dielectric losses (tanδ) are determined on 1 mm thick pressed sheets at 23° C. and 80° C. and at a frequency of 60 Hz.

COMPARATIVE EXAMPLE B

Polyethylene as in Comparative Example A is blended with a copolymer consisting of 82% by weight of ethylene and 18% by weight of n-butyl acrylate so that the blend contains 2.6% by weight of n-butyl acrylate. A heat stabilizer and a crosslinking agent as in Comparative Example A (cf. EP-A-248 148) are added.

Testing is carried out as in Comparative Example A, and the result is shown in the Table.

COMPARATIVE EXAMPLE C

An ethylene/n-butyl acrylate copolymer containing 2.6% by weight of copolymerized n-butyl acrylate and having a melt flow index of 2 g/10 min and a density of 0.918 g/cm$^3$ is treated with a heat stabilizer and a crosslinking agent as in Comparative Example A.

Testing is carried out as in Comparative Example A, and the result is shown in the Table.

EXAMPLE 1

90 parts by weight of polyethylene (as in Comparative Example A) are blended with 10 parts by weight of a copolymer of 88 parts by weight of ethylene and 12 parts by weight of but-1-ene, having a density of 0.903 g/cm$^3$, a melt flow index of 1 g/10 min, a ratio $\overline{M}_w/\overline{M}_n$ of 6 and a crystallite melting point of 121° C. A heat stabilizer and a crosslinking agent as in Comparative Example A are added.

Testing is carried out as in Comparative Example A, and the result is shown in the Table.

EXAMPLE 2

90 parts by weight of polyethylene as in Comparative Example B are blended with 10 parts by weight of the ethylene/but-1-ene copolymer described in Example 1. A heat stabilizer and a crosslinking agent as in Comparative Example A are added.

Testing is carried out as in Comparative Example A, and the result is shown in the Table.

EXAMPLE 3

90 parts by weight of polyethylene as in Comparative Example C are blended with 10 parts by weight of the ethylene/but-1-ene copolymer described in Example 1. A heat stabilizer and a crosslinking agent as in Comparative Example A are added.

Testing is carried out as in Comparative Example A, and the result is shown in the Table.

TABLE

| Example | Number of water trees after | | | |
|---|---|---|---|---|
| | 1 day | 2 days | 10 days | 100 days |
| A | 70 | 100 | | |
| B | 50 | 100 | | |
| C | 50 | 100 | | |
| 1 | 0 | 0 | 0 | 0 |
| 2 | 0 | 0 | 0 | 0 |
| 3 | 0 | 0 | 0 | 0 |

We claim:

1. An electric high voltage cable of 1–500 kV, wherein the cable insulation is resistant to the formation or the growth of water trees and consists essentially of from 70 to 99 parts by weight of an ethylene polymer (I) and from 1 to 30 parts by weight of an ethylene copolymer (II), which differs from (I) and is composed of from 80 to 92% by weight of ethylene and from 8 to 20% by weight of a C$_4$–C$_{10}$-α-olefin, the copolymer II having a density of from 0.890 to 0.915 g/cm$^3$, a ratio of $\overline{M}_w/\overline{M}_n$ of from 3 to 6, a crystallite melting point of from 90° to 125° C. and is prepared using a Ziegler catalyst system.

2. An electric high voltage cable as defined in claim 1, wherein the ethylene polymer (I) is an ethylene homopolymer prepared by the high pressure polymerization process, an ethylene/alkyl acrylate copolymer, an ethylene/alkyl acrylate/acrylic acid terpolymer or a blend of these polymers.

3. An electric high voltage cable as defined in claim 1, wherein the ethylene polymer (I) has a melt flow index of from 0.2 to 10 g/10 min and a density of from 0.890 to 0.934 g/cm$^3$.

4. An electric high voltage cable as defined in claim 1, wherein the ethylene copolymer (II) has a heterogeneous distribution of the α-olefin and possesses a melt flow index of from 0.5 to 20 g/10 min.

* * * * *

UNITED STATES PATENT AND TRADEMARK OFFICE
CERTIFICATE OF CORRECTION

PATENT NO. : 4,997,713
DATED : March 5, 1991
INVENTOR(S) : Ernst KOEHNLEIN et al.

It is certified that error appears in the above-identified patent and that said Letters Patent is hereby corrected as shown below:

ON THE COVER PAGE insert --ASSIGNEE

BASF Aktiengesellschaft,

Ludwigshafen, Federal Republic of Germany--

Signed and Sealed this

Twenty-fifth Day of January, 1994

Attest:

BRUCE LEHMAN

*Attesting Officer*    *Commissioner of Patents and Trademarks*